United States Patent
Sacks et al.

(10) Patent No.: US 8,508,839 B2
(45) Date of Patent: Aug. 13, 2013

(54) SYSTEM AND METHOD FOR CONTROLLING OPTICAL OUTPUT OF A FREQUENCY CONVERSION DEVICE

(75) Inventors: Zachary Sacks, Modiin (IL); Ady Arie, Herzeliya (IL); Ofer Gayer, Kfar Yedidya (IL)

(73) Assignees: Ramot At Tel-Aviv University Ltd., Tel Aviv (IL); Elbit Systems Electro-Optics Elop Ltd., Rehovot (IL)

( * ) Notice: Subject to any disclaimer, the term of this patent is extended or adjusted under 35 U.S.C. 154(b) by 0 days.

(21) Appl. No.: 13/120,928

(22) PCT Filed: Sep. 15, 2009

(86) PCT No.: PCT/IL2009/000900
§ 371 (c)(1),
(2), (4) Date: Jun. 9, 2011

(87) PCT Pub. No.: WO2010/035255
PCT Pub. Date: Apr. 1, 2010

(65) Prior Publication Data
US 2011/0242645 A1    Oct. 6, 2011

(30) Foreign Application Priority Data

Sep. 28, 2008  (IL) .......................................... 194408
Sep. 7, 2009   (IL) .......................................... 200776

(51) Int. Cl.
*G02F 1/35*    (2006.01)
*G02F 2/02*    (2006.01)

(52) U.S. Cl.
USPC .......................................... 359/326; 359/332

(58) Field of Classification Search
USPC .......................................... 359/330
See application file for complete search history.

(56) References Cited

U.S. PATENT DOCUMENTS

2005/0286603 A1    12/2005  Pomeranz
2008/0013163 A1*    1/2008  Leonardo et al. ........ 359/341.31
(Continued)

FOREIGN PATENT DOCUMENTS

GB            1265679         3/1972

OTHER PUBLICATIONS

Database Inspec [Online] The Institution of Electrical Engineers, Stevenage, GB; Jul. 15, 2003, Waxer L J et al. "High-Conversion-Efficiency Optical Parametric Chirped-Pulse Amplification System Using Spatiotemporally Shaped Pump Pulses", Database accession No. 7821976, & Optics Letters Opt. Soc. America USA, vol. 28, No. 14, pp. 1245-1247, ISSN: 0146-9592.

(Continued)

*Primary Examiner* — Hemang Sanghavi
(74) *Attorney, Agent, or Firm* — Pearl Cohen Zedek Latzer, LLP (57) ABSTRACT

A system and method for improving conversion efficiency of a difference frequency generator (DFG) and/or for outputting a desired shape of the output signal, where the method includes providing a pump source, modifying the pump pulse temporal shape for optimal DFG conversion efficiency, and providing the modified pump pulse to the DFG. The pump source may be, for example, a MOPA laser or a diode or any other suitable source. In one embodiment, the pump pulse shape is modified such that an initial gain within the DFG is high, followed by a lower level signal for efficient conversion within the DFG. An example of such a shape is a double square pulse. Other configurations are possible as well such as a single rectangular pulse shape.

14 Claims, 10 Drawing Sheets

(56) References Cited

U.S. PATENT DOCUMENTS

2009/0201966 A1* 8/2009 Hirth et al. .................. 372/70
2010/0177794 A1* 7/2010 Peng et al. .................. 372/25
2012/0092755 A1* 4/2012 Baird et al. ................. 359/328

OTHER PUBLICATIONS

Vu et al. "Adaptive Pulse Shape Control in a Diode-Seeded Nanosecond Fiber MOPA System", Optics Express, Nov. 2006.
Peng et al. "355cm Tailored Pulse Tandem Amplifier", Advanced Solid State Photonics, MC35, Jan. 2008.
Shaikh et al. "Activation of a Kilo Joule Energy Variable Shape Long Pulse System for the Vulcan Glass Laser", Advanced Solid State Photonics, MC7, Jan. 2008.
Office Action issued on Feb. 2, 2012 for EP 09748489.3.
Yonghang Shen et al: "PPMgLN-Based High Power Optical Parametric Oscillator pumped by Yb-Doped Fiber Amplifier Incorporates Active Pulse Shaping" IEEE Journal of Selected Topics in Quantum Electronics, IEEE Service Center, Piscataway, NJ, US, vol. 15, No. 2, Mar. 1, 2009, pp. 385-392, XP011254851, ISSN: 1077-260X, the whole document.
Hugonnot J Luce N Beck H Coic E: "Nd: glass regenerative amplifier with spatiotemporally shaped pulses for pumping an optical parametric chirped pulse amplification laser system" Quantum Electronics and Laser Science, 2005 Conference Baltimiore, MD, US, May 22-27, 2005, Piscataway, NJ, USA, IEEE, vol. 2, May 22, 2005, pp. 847-849, XP010887509, ISBN: 978-1-55752-796-7, the whole document.
Turner M C et al: "Double pumped OPO generates signal that matches the pump temporal characteristics", Lasers and Electro-Optics, 2004 (CLEO). Conference on San-Francisco, CA, USA, May 20-21, 2004, Piscataway, NJ, USA, IEEE, vol. 1, May 17, 2004, pp. 418-421, XP010745320, ISBN: 978-1-55752-777-6, the whole document.
International Search Report of the International Searching Authority (ISA/EP) dated Dec. 22, 2009 and Written Opinion for the corresponding PCT application No. PCT/IL2009/000900.

* cited by examiner

SYSTEM AND METHOD FOR CONTROLLING OPTICAL OUTPUT OF A FREQUENCY CONVERSION DEVICE

CROSS REFERENCE TO PRIOR APPLICATION

The present application is a National Stage Application of PCT International Application No. PCT/IL2009/000900 (filed on Sep. 15, 2009), under 35 U.S.C. §371, which claims priority to Foreign Israeli Patent Application No.194,408 (filed on Sep. 28, 2008) and Foreign Israeli Patent Application No. 200,776 (filed on Sep. 7, 2009) which are each hereby incorporated by reference in their respective entireties.

FIELD OF THE INVENTION

The present invention relates to a system and method for controlling output of a difference frequency generator via control of an input pump pulse temporal shape using a single laser source.

BACKGROUND OF THE INVENTION

Nonlinear difference frequency processes, such as optical parametric oscillation, optical parametric amplification and optical parametric generation are used to generate longer wavelengths from a shorter wavelength via a process called difference frequency generation (DFG) using a nonlinear crystal. In optical parametric oscillation for example, the crystal converts the pump wavelength (i.e., the input wavelength) into two longer wavelengths—the signal and the idler. The nonlinear conversion generally requires high intensities of light, and, as such, the crystal may be placed inside a cavity to enhance the electric field of some or all of the wavelengths involved. The cavity can resonate one, two, or three wavelengths to increase the electric field of the light inside the cavity. A device in which light is resonated to convert longer wavelengths is called an optical parametric oscillator (OPO), an optical parametric amplifier (OPA), or an optical parametric generator (OPG).

Generally, the light-to-light conversion efficiency of an OPO is approximately one-half of the quantum limit. For example, if a 1 µm to a 4 µm conversion is desired, the expected efficiency would be about $0.5*1$ µm/4 µm, or 12.5%. Reported values are typically around 10%, probably due to additional absorption in typical crystals used for this conversion. In order to generate 4 µm from 1 µm, seeds at 4 µm and 1.45 µm are required. If only the pump pulse is used, as is typical in an OPO, the seeds are quantum noise. It takes time to amplify the quantum noise, and, as such, this is one of the factors that contribute to the efficiency being lower than the quantum limit.

During this build up time, the pump is not efficiently converted to the signal and idler; the signal and idler are being amplified from noise to detectable levels. Thus, this pump power does not achieve significant conversion, and can be considered to be wasted. Typically, this build up time is a significant portion of the pump pulse duration. One way to increase efficiency might be to provide two sources: a pump and a signal or idler (seeder). However, seeding the nonlinear process adds a significant amount of complexity and cost since two sources must be used and synchronized. In addition, after a significant amount of signal and idler have been generated, efficiency may also be reduced due to back conversion. In this process, a signal and an idler photon are combined to produce a pump photon. For example, if a pulse with a temporal profile of a Gaussian is used, the build up time will be long since the pump intensity gradually increases, and back conversion will occur since the pump intensity is not constant. That is, the conversion efficiency will rise and fall as the pulse intensity changes. The conversion is only optimized for specific values of pump intensity.

Other approaches to improving OPO efficiency have included: 1) improvement of the crystal quality, minimizing absorption, and maximizing the nonlinear gain in the case of periodically poled materials; 2) use of an OPA after the OPO to convert a portion of the remaining pump light to the desired wavelength; 3) modification of the OPO cavity either by using multiple crystals or by optimization of the mirror reflectivities and curvatures; 4) design of the OPO to include multiple conversion processes to obtain the desired wavelength at higher powers.

Changing the OPO parameters will generally only lead to efficiencies of about half of the quantum limit. In addition, most of the parameters are fixed for a given system and cannot be changed in real time during OPO operation. If they can be changed, generally it is quite costly and time consuming process. Therefore the optimization is limited since many experimental variables are not known and cannot be accurately modeled. Inserting an OPA after the OPO increases the cost and complexity of the system. Using OPOs with multiple processes, e.g. an OPO with an additional crystal for difference frequency generation, requires that all processes be simultaneously phase matched, thereby dramatically increasing the sensitivity to temperature and manufacturing tolerances. In addition, additional material is added to the OPO which may cause additional absorption of the radiation.

There is thus a need for a system and method for increasing difference frequency generator efficiency while maintaining the architecture of the difference frequency generator.

SUMMARY OF THE INVENTION

There is provided, in accordance with additional embodiments of the present invention, a system for changing a wavelength of a laser. The system includes a pump source configured to provide a pump pulse having a modified pump pulse temporal shape and a difference frequency generator for receiving the modified pump pulse from the pump source and for producing a frequency generator output from the received pump pulse.

In some embodiments the modified pump pulse includes at least a first region and a second region, which may have different intensities and optionally different pulse durations. The second region and optionally the first region may include rectangular pulse shapes each having a substantially flat peak.

In other embodiments the modified pump pulse may include a single rectangular pulse shape having a substantially flat peak. The intensity of the peak and the duration of the signal may be optimized to achieve an optimal conversion efficiency of the difference frequency generator.

The modification of the pump pulse may be carried out in any way that allows changing the pulse properties (such as shape, duration and intensity) according to any requirement of the system. For example, the modification may include preselecting of a pump pulse (according to the pump pulse properties such as peak, duration and shape); or reshaping of the input pulse according to predefined rules.

In some embodiments, the system further includes a modulator for modulating the pump source so as to provide the pre-selected pump pulse shape. The modulator may be incorporated within the pulse modifiable source or applied externally thereto. The modulator may be an electrical current modulator in the case of a diode or a photon modulator in the case of a CW light source. The difference frequency generator may be an OPO, an OPA, an OPG or any other type of difference frequency generator.

The pump source may be a fiber laser, a bulk laser, a fiber master oscillator power amplifier (MOPA) laser, a bulk MOPA laser, a hybrid fiber-bulk laser, a continuous wave (CW) fiber laser, or a diode, or any other suitable source. The pump source may have a MOPA architecture having an oscillator, wherein the oscillator may be a CW source or a pulsed source.

There is provided, in accordance with embodiments of the present invention, a method for changing a wavelength of a laser. The method includes providing a pump source configured to provide a pump pulse having a pre-selected pump pulse temporal shape, inputting the pump pulse to a difference frequency generator, and generating a frequency generator output based on the input pump pulse.

For the above system and method, the pump pulse shape may be any temporal shape suitable for input into the difference frequency generator and for producing a desired frequency generator output. For example, a first region of the pump pulse shape may be selected for decreasing a rise time of the frequency generator output, thus minimizing the build up time of the signal and idler of the difference frequency generator, and a second region may be configured for maximization of conversion efficiency of the difference frequency generator. The pump pulse intensity of the second region could be constant, in which the conversion efficiency is maximized. In some embodiments, the first region has a shorter duration than the second region. In some embodiments, the pump pulse shape is approximately of a so called "double square". When the pump pulse shape may include an initial peak having a first amplitude followed by a flat signal (a rectangular region) having a second amplitude, wherein the first amplitude is higher than the second amplitude. Other desired pump pulse profiles may be pre-selected in accordance with additional embodiments of the present invention so as to produce desired output pulse shapes from the difference frequency generator.

Thus, the frequency generator output may be controlled during its operation by controlling the pump pulse shape, and may result in either a more highly efficient process within the frequency generator, or may result in a desired frequency generator output shape for particular applications.

In some embodiments, a pump laser of the master oscillator power amplifier (MOPA) may be used to generate the desired pulse shape. In such a laser architecture, the pulse shape that will provide the desired output pump pulse shape to the OPO, OPA, or OPG is generated in the oscillator. In some embodiments, the pulse shape may be modified using a modulator that either modulates the light signal directly (optical modulator) or using a modulated electrical signal to generate the desired pump pulse shape (e.g., current on a laser diode). The amplifier or amplifiers after the oscillator may continue to modify the temporal pulse shape due to gain saturation and nonlinear effects. Thus, in some cases, the modification of the oscillator pulse may not initially result in optimal pulse parameters for the difference frequency generator, and when optimal pulse parameters are not obtained, the method may further include further modifying the output pulse until the output pulse is optimized for difference frequency generator performance.

According to other embodiments of the invention, there is provided a method of converting a wavelength of a laser, wherein the method comprises: modifying the shape of a pump pulse of a pump source; inputting the modified pump pulse to a difference frequency generator; and generating an output of the difference frequency generator based on the input modified pump pulse. The modified pump pulse may include at least one rectangular pulse having a substantially flat peak.

The modification of the pump pulse, which may include modifying the peak intensity and pulse duration, may be carried out to optimize a conversion efficiency of the difference frequency generator.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The above and further advantages of the present invention may be better understood by referring to the following description in conjunction with the accompanying drawings in which.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the present invention. It will be understood by those of ordinary skill in the art that the present invention may be practiced without these specific details. In other instances, well-known methods, procedures, components and structures may not have been described in detail so as not to obscure the present invention.

The present invention is directed to a system and method for controlling the output (such as increasing the efficiency of or achieving a specific output pulse temporal shape) from a difference frequency generator (DFG), such as an OPO, OPA or OPG. The principles and operation of a system and method according to the present invention may be better understood with reference to the drawings and accompanying descriptions.

Before explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention provides increased efficiency or obtaining of a desired output pulse temporal shape by modification of pulse parameters for input pump pulse into a DFG. Typically, DFGs are designed for the specific laser source rather than the laser source being designed or modified for them. The usual approaches for improving efficiency are to either improve or modify parameters or components of the DFG itself, or to provide multiple pulse inputs (seeding) to the DFG, or to include additional amplifying stages. The present invention provides a system and method for improved DFG efficiency and/or for obtaining of a desired output pulse shape without the need for multiple input sources and without modification of the DFG itself. Although the description that follows refers to an OPO, it should be readily apparent that similar systems and methods for controlling (i.e., improving efficiency or altering the pulse shape of) an OPA or OPG are also included within the scope of the present invention.

The modification of the pump pulse may be carried out in any way that allows changing the pulse properties (such as shape, duration and intensity) according to any requirement of the system. For example, modification may include preselecting of a pump pulse (according to the pump pulse properties such as peak, duration and shape); or changing of the input pulse properties according to predefined rules (e.g., according to a predefined algorithm).

Figures 1, 2:
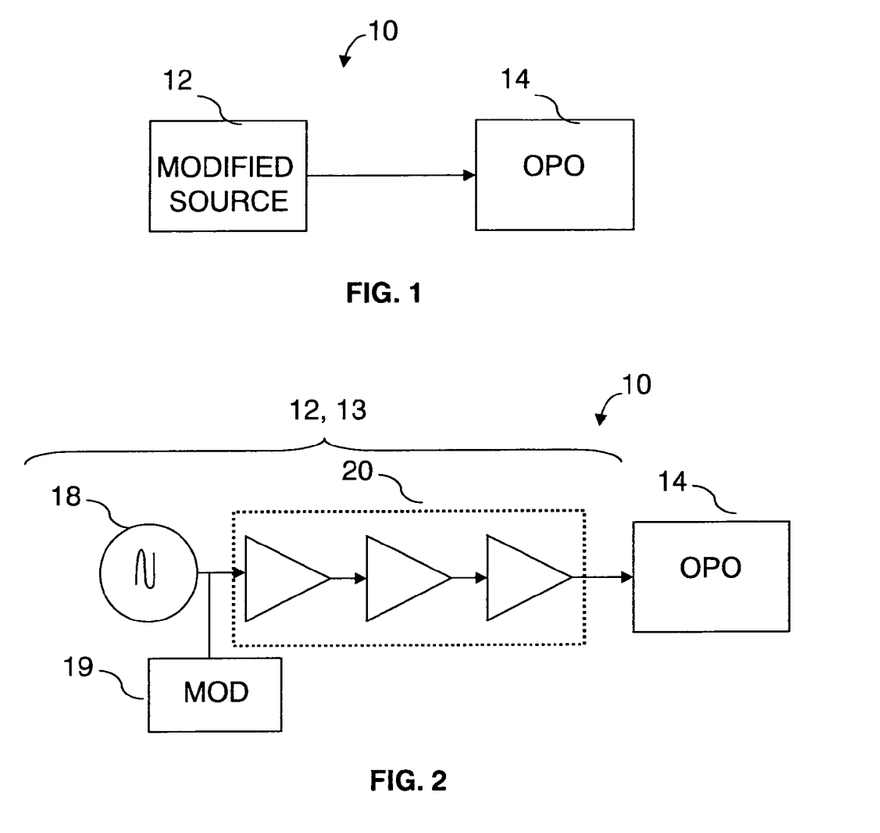
FIG. 1 is a block diagram illustration of a system for increasing efficiency of an OPO, in accordance with embodiments of the present invention.
FIG. 2 is a schematic illustration of the system of FIG. 1, wherein the source is a MOPA (master oscillator power amplifier) laser, including a master oscillator for providing a seed pulse and an amplifier, in accordance with embodiments of the present invention.

Reference is now made to FIG. 1, which is a block diagram illustration of a system 10 for increasing efficiency of an OPO, in accordance with embodiments of the present invention. Generally, an OPO is pumped by an existing, unmodified pulse from a source. In the present invention, a modification of the pump pulse via tailored parameters to optimize OPO 14 is provided. System 10 includes a single modified pump source 12 and an OPO 14. Modified pump source 12 may be any source which can be modified, either externally or internally, and which may be suitable for producing a pulse or continuous wave radiation, such as a bulk laser, fiber laser, hybrid laser, or diode. The modified source pulse is sent directly to OPO 14. In general, modulation of the pulse to the desired shape is generally performed at low power in order to use the laser power efficiently and since technologies for arbitrary pulse shaping are more straightforward at lower powers. One objective of modifying the pulse shape is to decrease the build up time and maximize the steady state conversion. Another objective may be to specifically shape the pump pulse to achieve the desired output pulse for a specific application. Such control of the pump pulse may be used to arbitrarily modulate the output pulse.

In one embodiment, as shown in FIG. 2, modified source 12 is a MOPA (master oscillator power amplifier) laser 13, which includes a master oscillator 18 for providing a seed pulse and an amplifier 20. A modulator 19 is added to MOPA laser 13, either between the oscillator 18 and the amplifier chain 20, as shown in FIG. 2, or directly within oscillator 18, e.g., using electrical pumping of a diode oscillator. Modulator 19 is used to modify the seed pulse of master oscillator 18. The modified pulse is sent to amplifier 20, which in some embodiments may comprise a string of amplifiers, as shown in FIG. 2. The example shown in FIG. 2 is one example of an external modulator of a CW source, wherein the modulating is done by optical modulation.

In some embodiments, amplification is in a range of 40-50 dB, which will cause distortion to the pulse due to gain saturation. Thus, even after particular input pulse parameters are identified, such as a desired input pulse shape, for example, it must be determined how to arrive at the desired parameters while taking into account saturation effects or other distortions. Thus, the final input pulse characteristics, including shape, pulse duration, peak power, spectrum, and others which may be selected for optimal OPO performance must be determined or derived, experimentally and/or algorithmically. Examples of how to make such determinations are included in the Examples section below. Methods for pulse shape control are described for other applications, such as for materials processing, and can be found, for example, in Vu et al.: "Adaptive pulse shape control in a diode-seeded nanosecond fiber MOPA system", Optics Express, Nov. 2006, incorporated by reference herein in its entirety. The modified input pulse, which is the output from amplifier 20, is then input into OPO 14.

In some embodiments, MOPA laser 13 may be a MOPA fiber laser or a hybrid fiber-bulk laser system using a bulk regenerative amplifier or multipass amplifier. The use of a MOPA laser (alone or as a seed source for a bulk amplifier) makes it possible to change the pulse parameters by the use of an external or internal modulator 19, which would not be possible using a standard laser or a fiber laser. Generally, fiber lasers or standard lasers do not have the ability to adjust the output pulse to the desired waveforms without the use of specialized electronics.

Figure 3:
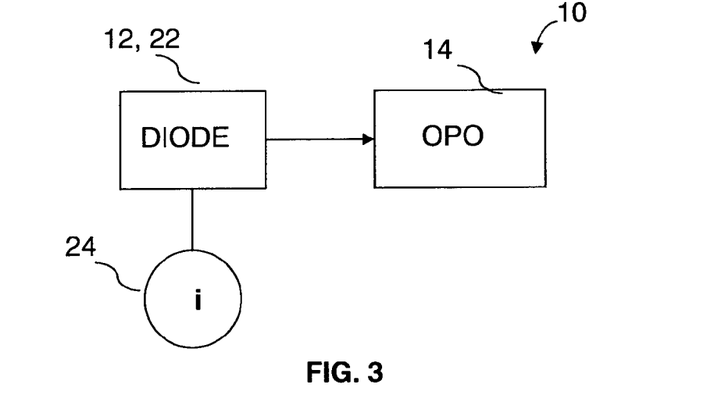
FIG. 3 is a schematic illustration of the system of FIG. 1, wherein the source is a diode, and the modifier is an electrical current modifier, in accordance with embodiments of the present invention.

In another embodiment, as shown in FIG. 3, source 12 is a diode 22 (or MOPA with a diode oscillator) which is externally modulated via an electrical current modulator 24. Electrical current modulator 24 modifies the current in diode 22, and the modified pulse, which typically follows the electrical pulse signal, is sent to OPO 14 directly or after passing through a series of amplifiers, as in FIG. 2.

Figure 4A:
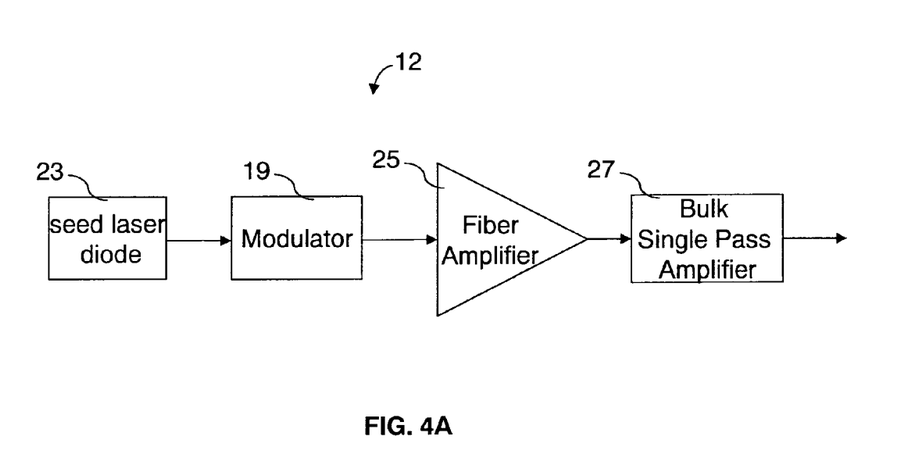
FIGS. 4A and 4B are schematic illustrations showing more detailed examples of the system of FIG. 3.
Figure 4B:
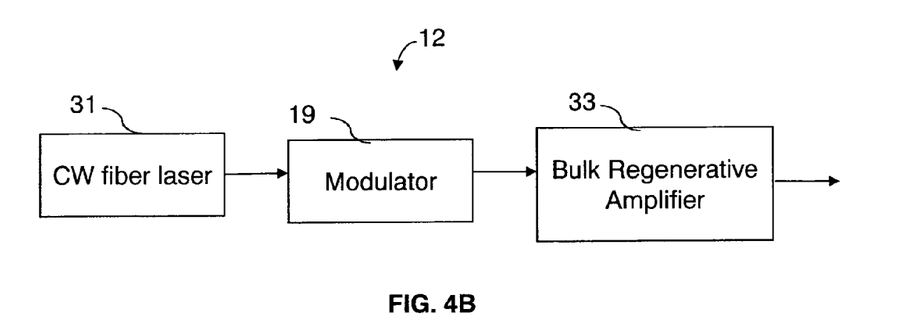

Reference is now made to FIGS. 4A and 4B, which illustrate more detailed examples of a system with external modulation, such as that shown in FIG. 2. In one embodiment, as shown in FIG. 4A, modified source 12 is a CW seed laser diode 23, modulated by an optical modulator 19. Optical modulator 19 may be, for example, an electro-optic modulator, an electro-absorption modulator, or an acousto-optic modulator. The modulated signal is fed into a fiber amplifier 25 and into a bulk single pass amplifier 27. Such systems are described in, for example, Peng et al., "355 nm Tailored Pulse Tandem Amplifier," Advanced Solid State Photonics, MC35, Jan 2008, incorporated by reference herein in its entirety. In Peng et al., a double rectangular pulse was created for optimizing third harmonic generation for a material processing application.

In another embodiment, as shown in FIG. 4B, modified source 12 is a CW fiber laser 31, which is modulated by an optical modulator 19. The modulated signal is then fed into a bulk regenerative amplifier 33. Such systems are described in, for example, Shaikh et al., "Activation of a Kilo Joule Energy Variable Shape Long Pulse System for the Vulcan Glass Laser," Advanced Solid State Photonics, MC7, Jan. 2008, incorporated by reference herein in its entirety. In Shaikh et al., a CW fiber laser was modulated using an electro-optic Mach-Zender lithium niobate fiber coupled modulator. The shaped output pulse was then amplified by several orders of magnitude in a bulk regenerative amplifier to 2.5 mJ.

Figure 5:
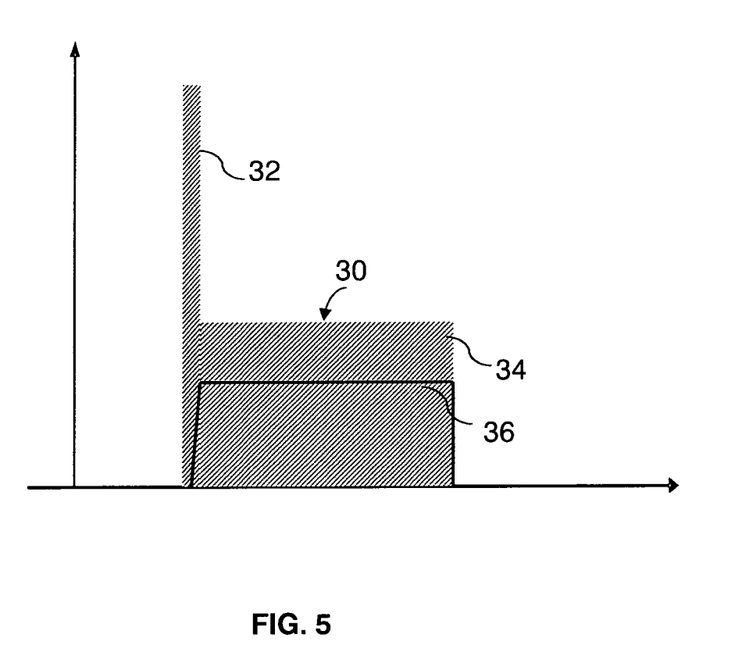
FIG. 5 is a graphical illustration of a modified pump pulse which may be used as an input pulse to an OPO, in accordance with embodiments of the present invention.

Reference is now made to FIG. 5, which is a graphical illustration of a modified pump pulse 30 which may be used as an input pulse to an OPO, in accordance with embodiments of the present invention. Modified pump pulse 30 has a first region 32 and a second region 34. First region 32 has a different configuration than second region 34, wherein first region 32 has a shape modified for achieving minimum signal and idler rise time and second region 34 has a modified shape for maximum OPO conversion. More specifically, in the example shown in FIG. 5, the rise time of first region 32 is shorter than the time for the pulse shape of modified second region 34. This can be accomplished, for example, by using a double square configuration, wherein first region 32 has an initial peak portion 32 followed by second region 34 having a lower flat level portion. First region 32 provides an initial gain for high amplification of the seed pulse at the outset. This allows for the signal and idler to reach a measurable level as quickly as possible. Once the signal and idler have reached the optimum value, the pump pulse can be lowered in order to achieve maximum conversion efficiency of the signal and idler 36 within the OPO. For simplicity, only the signal or idler 36 is shown. However, both should show approximately same temporal behavior since they are generated simultaneously from the same pump photon.

Figure 6:
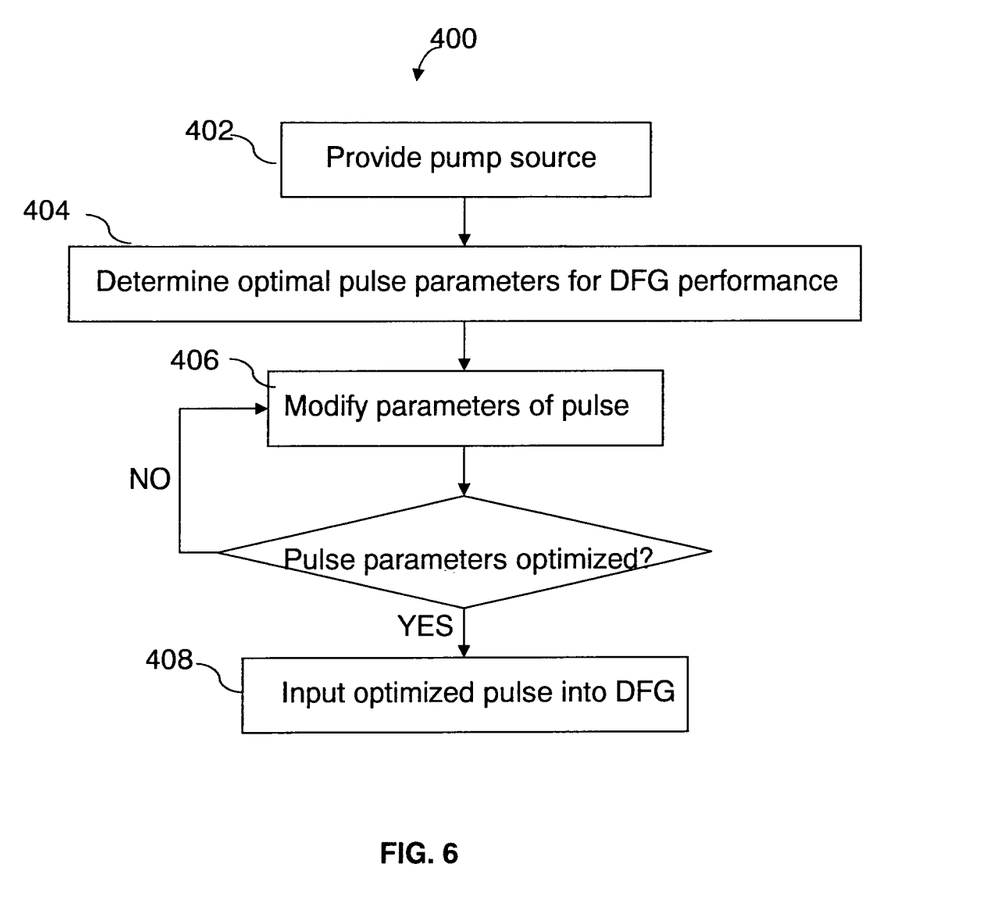
FIG. 6 is flow chart illustration of a method of improving DFG efficiency, in accordance with embodiments of the present invention.

Reference is now made to FIG. 6, which is a flow chart illustration of a method 400 of improving DFG (that is, OPO, OPA or OPG) efficiency or obtaining a desired pulse shape, in accordance with embodiments of the present invention. First, a pump source is provided (step 402). The pump source may be, for example, a CW fiber laser, a MOPA laser, a laser diode, or any source type in which the temporal pulse profile can be modified. Next, optimal parameters for DFG performance are determined (step 404). Parameters may include pulse shape, pulse duration, peak power, spectrum, and others. These parameters may be determined experimentally and/or algorithmically. The determined parameters are then modified (step 406), either by external or internal modulation of the pump source, or may be pre-selected. The modified parameters are then evaluated for optimal OPO, OPA or OPG performance. Evaluation may include actually sending the pulse to the OPO, OPA, and OPG. If the parameters are sufficiently modified, then the modified pulse is fixed and sent as an input (step 408) to the OPO, OPA or OPG. If the parameters have not yet reached the optimal level, they may be further modified (step 406) until they are optimized and then sent as an input (step 408) to the OPO, OPA or OPG.

EXAMPLE

Figure 7:
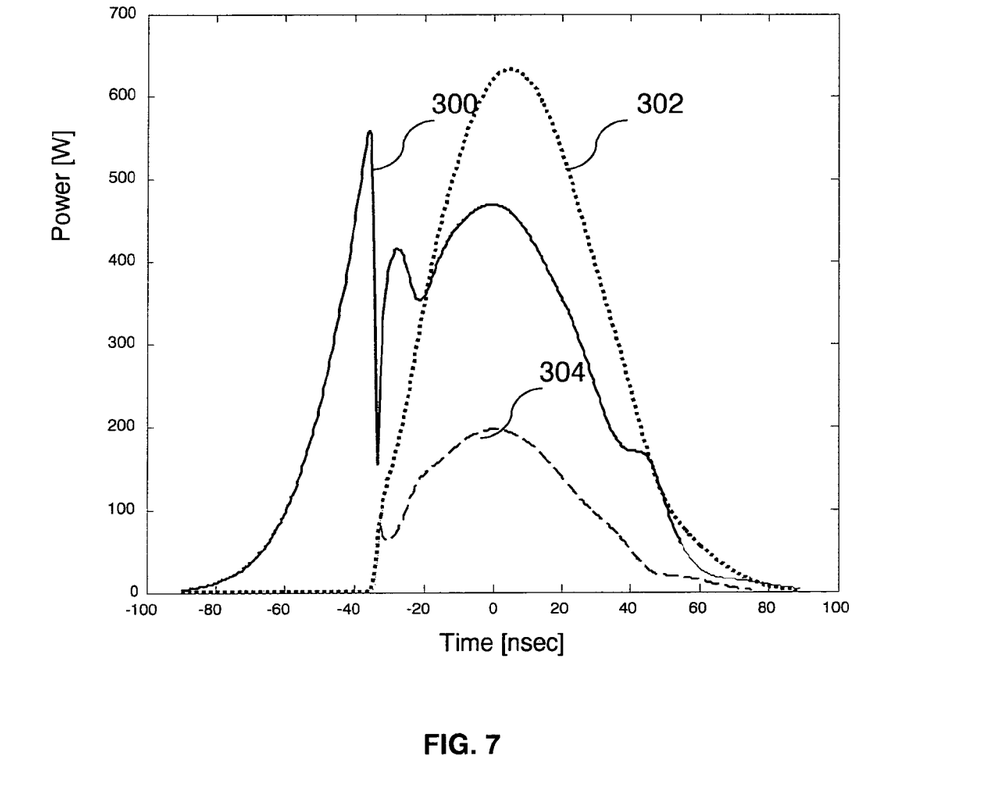
FIG. 7 is a simulated graphical illustration of OPO output with a standard Gaussian pulse input.

A simulation including two dimensional diffraction and beam propagation comparing the OPO performance between a standard Gaussian pump pulse and a modified pump pulse shape is provided. The following simulation parameters were used:

OPO type: single pass pump, singly resonant
OPO crystal: periodically poled lithium niobate (PPLN)
OPO type: single pass pump, singly resonant (i.e. only the signal wavelength is reflected by the output coupling mirror)
OPO wavelengths: pump=1064 nm, signal=1449.6 nm, idler=4000 nm
Dimensions: crystal length=40 mm, airgap=10 mm on each side
Mirror radius of curvature (ROC): 50 mm on each side
Pump energy=100 µJ Reference is now made to FIG. 7, which is a graphical illustration of simulated OPO output intensity versus time, with a standard Gaussian pulse input. Curve 300 represents the depleted output pump pulse, curve 302 represents the signal pulse and curve 304 represents the idler pulse. A typical pulse width of 60 ns (FWHM), and a signal reflection of R=0.9, were used. The simulated idler energy is 10.97 µJ. Thus, idler efficiency is 10.97%, which is approximately the value of experimentally measured efficiencies. Less than Optimal efficiency can be seen by the signal and idler starting after a significant time of the pump pulse and back conversion of the signal and idler to the pump as indicated by ripples in the depleted pump pulse.

Figure 8:
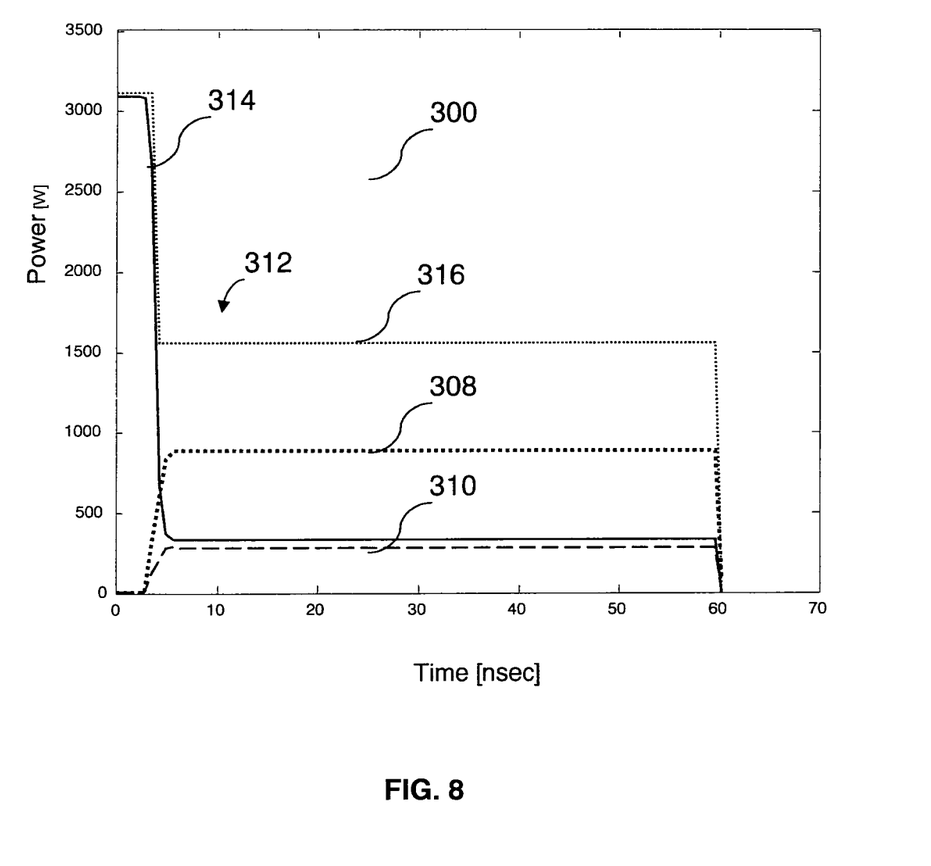
FIG. 8 is a simulated graphical illustration of OPO output with a modified pulse input.

Reference is now made to FIG. 8, which is a graphical illustration of a simulated OPO output with a modified pulse input 312. Curve 308 represents the signal pulse, curve 310 represents the idler pulse and curve 314 represents the depleted pump pulse. The modified pump pulse, as shown in curve 312, is a double square pulse having a first square portion 314 adjoined to a second square portion 316, wherein first square portion 314 is used for seeding, and second square portion 316 is used for "steady state" mode where most of the wavelength conversion takes place. The following parameters were used:

Total pulse width: 60 ns
Ratio between $1^{st}$ part and $2^{nd}$ part power amplitudes: 2
Ratio between $1^{st}$ part width and total pulse width: 0.07
Signal reflection: R=0.11

All other parameters of the simulation were the same as in the previous simulation with a Gaussian pulse shown in FIG. 7.

Figure 9:
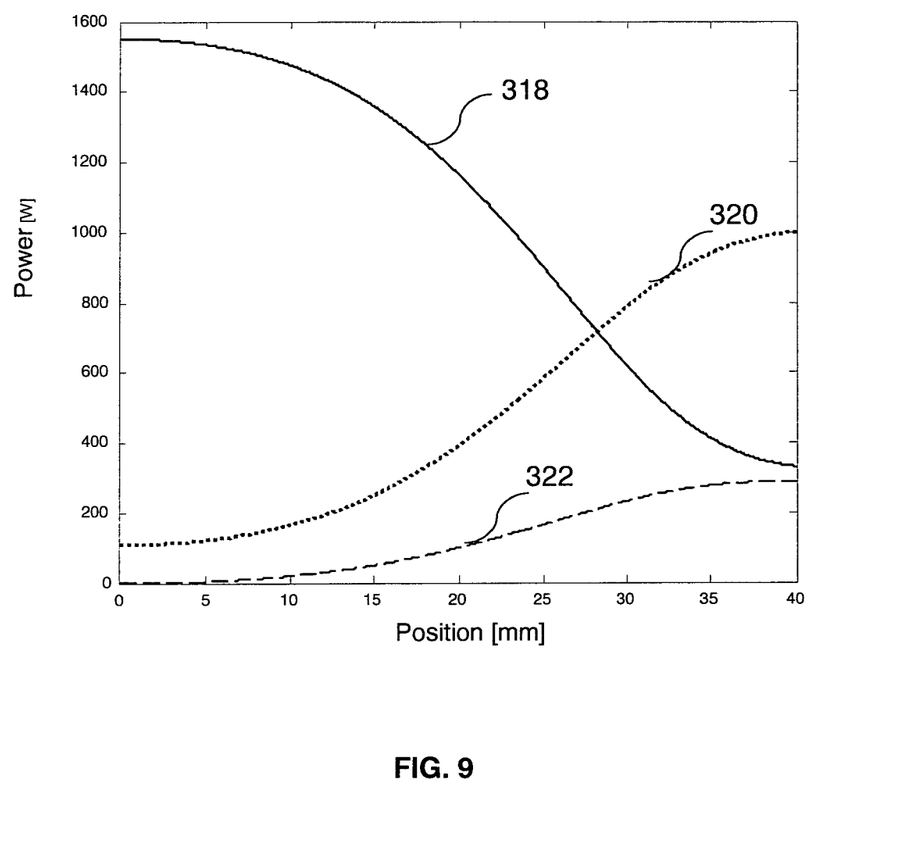
FIG. 9 is a simulated graphical illustration of pump, signal and idler intensities along the crystal during the steady state mode of the pulse.

Idler energy is 16.04 µJ, which is 16.04% efficiency, about 45% increase in efficiency compared to the standard Gaussian pulse shown in FIG. 7. Also, the pump, signal and idler intensities versus position along the crystal during the steady state mode of the pulse are shown in FIG. 9, as curves 318, 320 and 322, respectively. As shown, the idler reaches its peak at the end of the crystal, without back-conversion, which is one of the reasons for the improved efficiency.

Moreover, "idler slope efficiency" is the efficiency at the steady state mode in the second part of the pulse. The overall idler OPO efficiency can be approached asymptotically to the calculated 18.37% idler slope efficiency, the longer the $2^{nd}$ part is (provided all other parameters are unchanged). For example, if the pulse width is increased to 200 ns and pump energy is increased accordingly to 320 µJ, then idler energy is 56.45 µJ, which is 17.64% efficiency (60% improvement compared to a Gaussian pulse).

Figure 10:
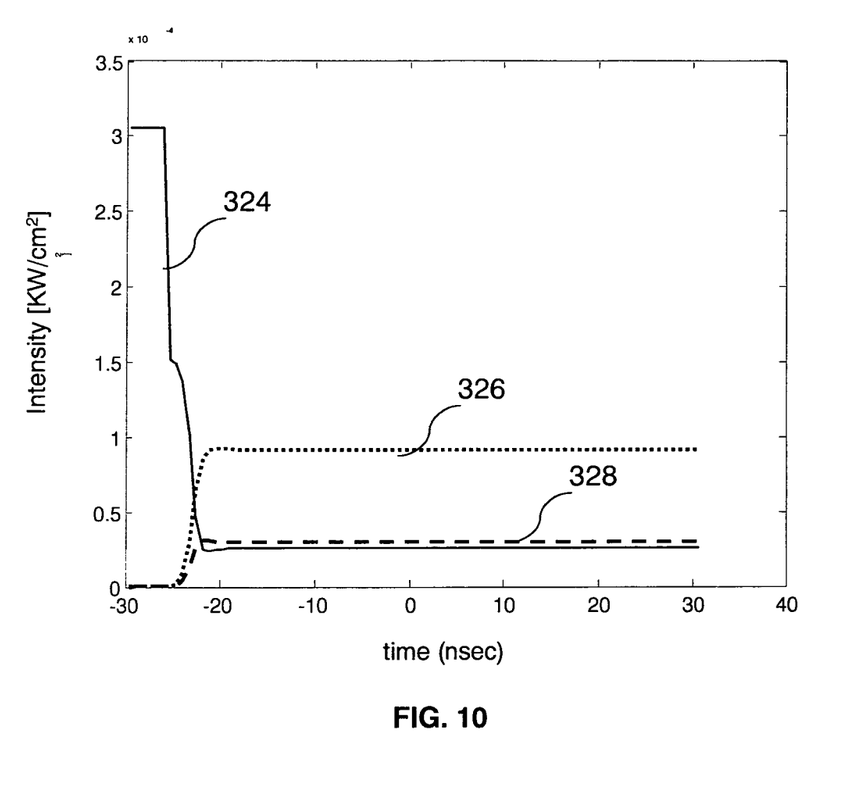
FIG. 10 is a simulated graphical illustration of OPO simulations with a modified pulse shape done with SNLO.

OPO simulations with the same modified pulse shape were also performed with a modified version of SNLO, the freeware standard for OPO simulations, as shown in FIG. 10. Input pulse is shown in curve 324, with signal and idler shown in curves 326 and 328, respectively. Similar efficiency of 16.2% was obtained with the same pulse parameters, but with some differences: 1) The optimal signal reflection is 25% (compared to 11% in the Matlab simulation); 2) Idler slope efficiency is slightly higher; 3) Signal and idler build-up in the beginning is slower, therefore reducing efficiency. These discrepancies further show the need for an adjustable pulse shape to find the optimal conversion parameters.

To conclude, these preliminary calculations indicate that roughly 50% improvement in efficiency is expected by controlling the pulse shape and selecting appropriate parameters, while no other changes in OPO design is required. Control of pulse shape may also result in additional benefits, such as: 1) Intensities within the OPO are much lower due to fact that the optimal signal reflection is very low, therefore avoiding the risk of crystal and mirror damage; 2) For the same reason, crystals with lower non-linearity such as $LiTaO_3$ can be used instead of $LiNbO_3$ without significant efficiency reduction, by proper choice of signal reflection; 3) The "steady state" behavior of idler output may indicate an improvement in beam quality.

According to other embodiments of the invention, the modified pump pulse may include a single substantially rectangular pulse shape having a single region, where the duration and peak of the pulse may be optimized to allow optimized build-up time and linear gain as well as optimized signal-idler conversion.

Figure 11:
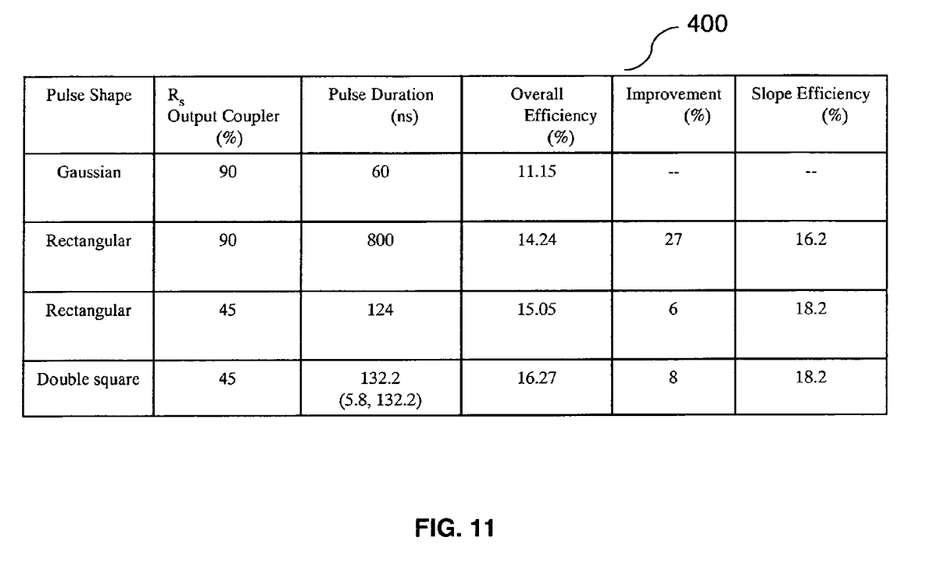
FIG. 11 is a table, schematically illustrating the influence of various simulated shapes and durations of the input pump pulse on the overall conversion efficiency.

FIG. 11 is a table 400, schematically illustrating the influence of various simulated shapes and durations of the input pump pulse on the overall conversion efficiency.

Different pulse shapes and pulse durations were used in the simulation, where the input energy used was a constant energy of 100 µJ. The simulation examined the influence of the shape and duration of the input pump pulse over the overall conversion efficiency (e.g., the efficiency of the output idler signal).

The rectangular pump pulse shape refers to a single rectangular pulse whereas the double square refers to a pulse shaped including two integrated rectangular pulses having two pump durations and peaks combined, where the first rectangle of the double square (also referred to as "the first region) is of a shorter duration and higher peak than the second rectangle (also referred to as the second region). As shown in FIG. 11, the rectangular and double square pump pulse shapes enable increasing the overall conversion efficiency by approximately 3-5% in respect to a Gaussian pump pulse shape conversion efficiency of the same 100 µJ energy, which improves the Gaussian efficiency by 20-50%.

Figure 12:
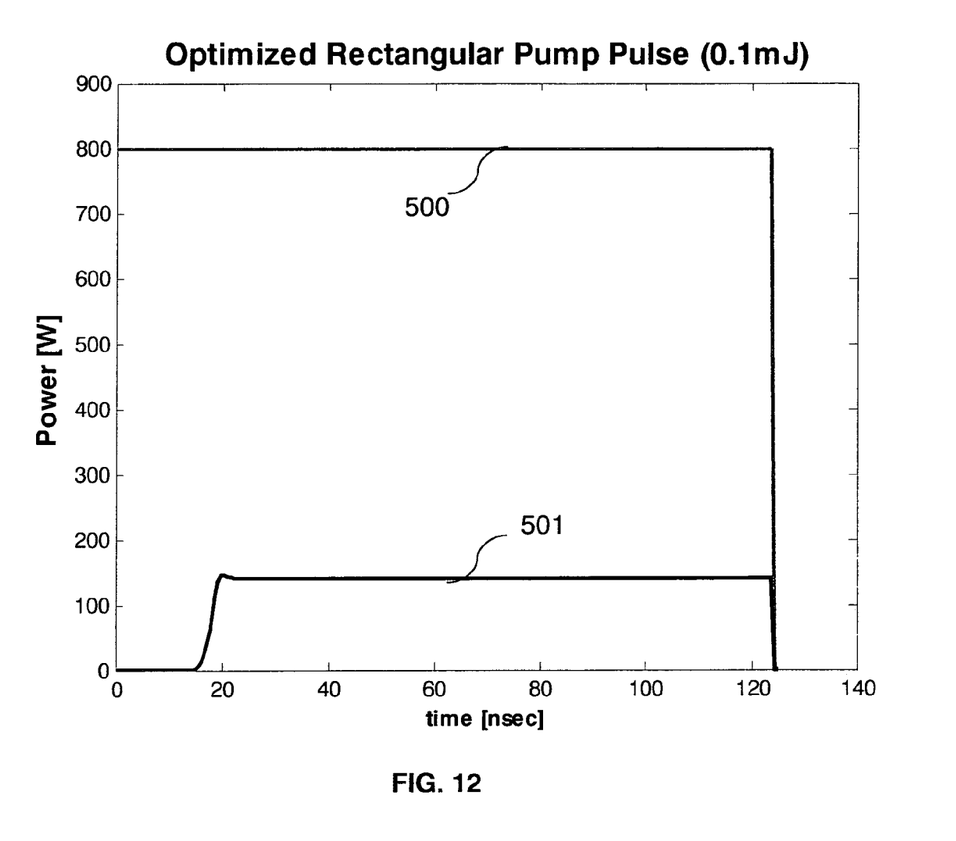
FIG. 12 is a simulated graphical illustration of an OPO rectangular input pump pulse and output idler.

FIG. 12 is a simulated graphical illustration of an OPO rectangular input pump pulse 500 and output idler 501. In this simulation a rectangular 0.1 mJ optimized input pump pulse 500 was used, outputting an output idler 501 having a substantially rectangular shape (where the other outputted pump pulse and signal are not shown in the graph).

The modified rectangular shape includes a single region in which there is provided a substantially constant energy peak throughout the duration of the pulse. The peak and duration of the input pump pulse are optimized for achieving at least one of: decreasing a rise time of the OPO output (or any other deference frequency generator used in the system) and for maximizing conversion efficiency of the OPO (or any other difference frequency generator used by the system).

The modification of the input pump pulse may be carried out for increasing conversion efficiency and/or for any other purpose known in the art. The modification may be carried out according to predefined requirements, wherein the rules for modification may be defined according to the specific requirements. For example, for material processing, in which a material layer is cut according to the shape of an optical output of the DFG.

While certain features of the present invention have been illustrated and described herein, many modifications, substitutions, changes, and equivalents may occur to those of ordinary skill in the art. It is, therefore, to be understood that the appended claims are intended to cover all such modifications and changes as fall within the true spirit of the present invention.

The invention claimed is:

1. A system for converting a wavelength of a laser, said system comprising:
   a pump source configured to provide a pump pulse having a modified pump pulse temporal shape; and
   an optical parametric oscillator (OPO) for receiving said pump pulse from said pump source and for producing an OPO output from said received pump pulse,
   wherein said modified pump pulse temporal shape comprises a first region and a second region,
   wherein said first region is of a different intensity and duration than said second region,
   wherein said first region of said pump pulse shape is modified for decreasing a rise time of said OPO, and
   wherein said second region is configured for optimizing conversion efficiency of said OPO.

2. The system of claim 1, wherein said first region has a shorter duration than said second region.

3. The system of claim 2, wherein said second region of said modified pump pulse includes a rectangular pulse shape having a substantially flat peak.

4. The system of claim 3, wherein said pump pulse temporal shape is approximately a double square, wherein said first region has a substantially rectangular pulse shape and said second region has a substantially rectangular pulse shape.

5. The system of claim 4, wherein said approximate double square shape comprises an initial peak having a first amplitude followed by a flat signal having a second amplitude, wherein said first amplitude is higher than said second amplitude.

6. A method of converting a wavelength of a laser, said method comprising:
   providing a pump pulse having a modified pump pulse temporal shape;
   inputting said pump pulse to an optical parametric oscillator (OPO); and
   generating an OPO output based on said input modified pump pulse,
   wherein said modified pump pulse shape comprises a first region and a second region,
   wherein said first region is of a different intensity and duration than said second region,
   wherein said first region of said pump pulse shape is modified for decreasing a rise time of said OPO, and
   wherein said second region is configured for optimizing conversion efficiency of said OPO.

7. The system of claim 6, wherein said first region has a shorter duration than said second region.

8. The method of claim 6, wherein said modified pump pulse shape is approximately a double square including a first pulse including a rectangular shape, which is the first region and a second pulse including a rectangular shape, which is the second region, wherein said first and second rectangular pulses are integrated to form the double square shape of the modified pump pulse.

9. The method of claim 6, wherein said inputting said pump pulse to the OPO comprises optimizing a conversion efficiency of the OPO.

10. The method of claim 6, wherein the OPO output is a modified profile output.

11. A method of converting a wavelength of a laser, said method comprising:
provising a pump pulse having a modified pump pulse temporal shape;
inputting said pump pulse to an optical parametric oscillator (OPO); and
generating an OPO output based on said input modified pump pulse,
wherein prior to the inputting, the method further comprises: checking said pump pulse shape and if said pump pulse shape pulse is not optimized for performance of the OPO, further modifying said pump pulse shape until said pump pulse shape is optimized for performance,
wherein said performance optimization comprises modified a first region of the pump pulse shape to decrease a rise time of said OPO, and configuring a second region of the pump pulse shape to optimize a conversion efficiency of said OPO.

12. A method of converting a wavelength of a laser, said method comprising:
providing a pump pulse having a modified pump pulse temporal shape;
generating an optical parametric oscillator (OPO) output based on said input modified pump pulse, further comprising modifying an input pump pulse to provide said modified pump pulse having a modified pump pulse temporal shape, wherein said pump pulse is modified to allow optimization of the conversion efficiency of the OPO by modifying a first region of the pump pulse shape to decrease a rise time of said OPO, and configuring a second region of the pump pulse shape to optimize a conversion efficiency of said OPO, and enabling to output at least one output pulse of a desired pulse shape, according to a predefined requirements.

13. A method of converting a wavelength of a laser, said method comprising:
modifying the shape of a pump pulse of a pump source;
inputting said modified pump pulse to an optical parametric oscillator (OPO); and
generating an output of the OPO based on said input modified pump pulse,
wherein said modified pump pulse includes at least one rectangular pulse having a substantially flat peak,
wherein said modification includes modifying the peak intensity and pulse duration, and
wherein said modification is carried out to optimize a conversion efficiency of said the OPO by modifying a first region of the pump pulse shape to decrease a rise time of said OPO, and configuring a second region of the pump pulse shape to optimize a conversion efficiency of said OPO.

14. A method of converting a wavelength of a laser, said method comprising:
receiving an input pump pulse;
modifying said input pump pulse so as to provide a modified pump pulse temporal shape; and
converting said modified pump pulse using an optical parametric oscillator (OPO)
wherein the temporal shape of said modified pump pulse includes at least one substantially rectangular pulse shape, and
wherein the duration and peak of each of said at least one rectangular pulse shape is defined according to requirements, comprising modifying a first region of the pump pulse shape to decrease a rise time of said OPO and configuring a second region of the pump pulse shape to optimize a conversion efficiency of said OPO.

* * * * *